United States Patent
Delorme et al.

(10) Patent No.: US 10,000,281 B2
(45) Date of Patent: Jun. 19, 2018

(54) CONTROL METHOD FOR CONTROLLING A BUOYANCY SYSTEM FOR AN AIRCRAFT, A BUOYANCY SYSTEM, AND AN AIRCRAFT

(71) Applicant: AIRBUS HELICOPTERS, Marignane (FR)

(72) Inventors: Louis Delorme, Ensues la Redonne (FR); Didier Bertin, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 29 days.

(21) Appl. No.: 15/417,702

(22) Filed: Jan. 27, 2017

(65) Prior Publication Data
US 2017/0327208 A1    Nov. 16, 2017

(30) Foreign Application Priority Data

Jan. 29, 2016  (FR) ...................... 16 00153

(51) Int. Cl.
*B64C 25/56*  (2006.01)
*G06F 17/11*  (2006.01)
*B64C 27/04*  (2006.01)

(52) U.S. Cl.
CPC .............. *B64C 25/56* (2013.01); *G06F 17/11* (2013.01); *B64C 27/04* (2013.01)

(58) Field of Classification Search
CPC .. B64C 25/56; G06F 17/11; B65D 2517/0055
See application file for complete search history.

(56) References Cited

U.S. PATENT DOCUMENTS

| | | | | |
|---|---|---|---|---|
| 4,655,415 A | * | 4/1987 | Miller | B64C 25/56 244/100 A |
| 8,418,957 B2 | * | 4/2013 | Smith | B64D 25/00 244/100 A |
| 8,474,753 B2 | * | 7/2013 | Hill | B64D 25/00 244/100 A |

(Continued)

FOREIGN PATENT DOCUMENTS

| | | | | |
|---|---|---|---|---|
| EP | 2735506 A1 | * | 5/2014 | ............ B64C 25/56 |
| FR | 2959725 | | 11/2011 | |

(Continued)

OTHER PUBLICATIONS

French Search Report for French Application No. FR 1600153, Completed by the French Patent Office, dated Oct. 7, 2016, 7 Pages.

*Primary Examiner* — Thomas G Black
*Assistant Examiner* — Ana D Thomas
(74) *Attorney, Agent, or Firm* — Brooks Kushman P.C.

(57) ABSTRACT

The present invention relates to a control method for inflating at least one float of a buoyancy system. During a mode (MOD1) of automatic inflation in flight, calculation means determine whether a predetermined ditching condition is true during a step (STP1) of predicting a forthcoming impact. During a step (STP2) of characterizing said impact, at least one predicted component of a ditching speed is determined. During an automatic inflation step (STP3), each float is automatically inflated in flight when at least said ditching condition is true and when each determined predicted component is less than a corresponding speed threshold.

16 Claims, 2 Drawing Sheets

(56) References Cited

U.S. PATENT DOCUMENTS

| | | | |
|---|---|---|---|
| 8,565,981 B2 | 10/2013 | Filias | |
| 8,870,115 B2 * | 10/2014 | Lu | B64C 25/56 244/100 A |
| 9,260,192 B2 * | 2/2016 | Lu | B64D 25/00 |
| 9,315,263 B2 * | 4/2016 | Cacciaguerra | B64C 25/56 |
| 9,469,398 B2 * | 10/2016 | Dijaux | B64C 25/54 |
| 9,487,301 B2 * | 11/2016 | Hill | B64C 25/52 |
| 9,505,282 B2 * | 11/2016 | Hu | B60F 5/02 |
| 9,533,757 B2 * | 1/2017 | Delorme | B64C 25/56 |
| 2005/0183331 A1 * | 8/2005 | Kania | A01G 9/00 47/65.5 |
| 2007/0008187 A1 * | 1/2007 | Schmidt | B64C 25/001 340/970 |
| 2010/0068955 A1 * | 3/2010 | Wiggin | B63B 22/04 441/7 |
| 2010/0070115 A1 * | 3/2010 | Villaume | B64D 45/04 701/18 |
| 2010/0100260 A1 * | 4/2010 | McIntyre | B64C 13/503 701/6 |
| 2011/0226898 A1 * | 9/2011 | Smith | B64D 25/00 244/100 A |
| 2011/0276232 A1 * | 11/2011 | Filias | B64C 25/56 701/45 |
| 2012/0132741 A1 * | 5/2012 | Certain | B64C 25/56 244/100 A |
| 2013/0327890 A1 * | 12/2013 | Lyons | B64C 25/56 244/107 |
| 2014/0124620 A1 * | 5/2014 | Giovangrossi | B64D 25/00 244/100 A |
| 2014/0252166 A1 * | 9/2014 | Smith | B64C 25/56 244/107 |
| 2014/0319265 A1 * | 10/2014 | Cacciaguerra | B64C 27/22 244/6 |
| 2016/0085239 A1 * | 3/2016 | Boyer | G08G 5/0021 701/5 |
| 2016/0376000 A1 * | 12/2016 | Kohstall | B64C 37/00 114/313 |
| 2017/0305573 A1 * | 10/2017 | Greene | G07C 5/0808 |

FOREIGN PATENT DOCUMENTS

| | | | |
|---|---|---|---|
| FR | 2997923 | 5/2014 | |
| WO | 2006046038 A2 | 5/2006 | |
| WO | 2006046038 A3 | 5/2006 | |
| WO | WO-2006046038 A2 * | 5/2006 | B63B 43/14 |

* cited by examiner

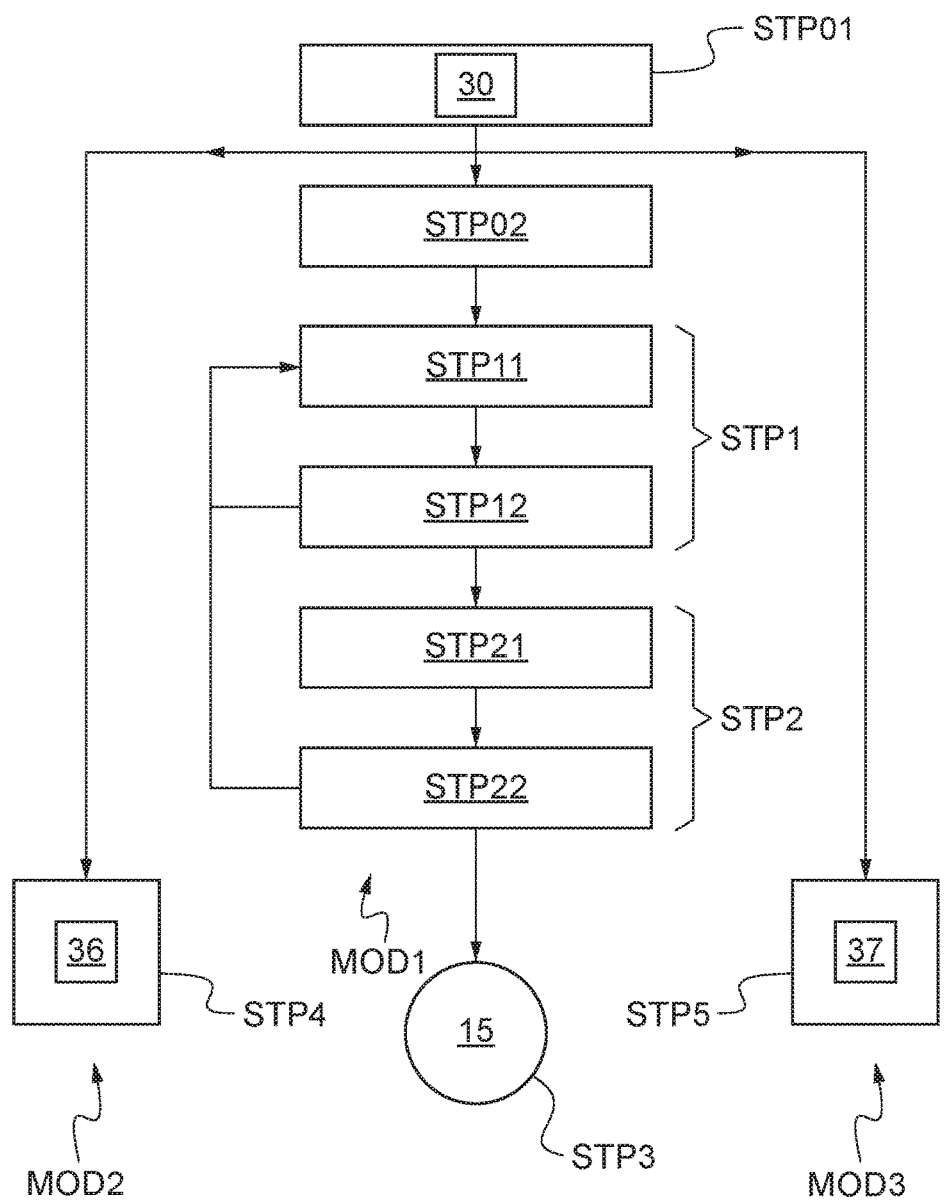

CONTROL METHOD FOR CONTROLLING A BUOYANCY SYSTEM FOR AN AIRCRAFT, A BUOYANCY SYSTEM, AND AN AIRCRAFT

CROSS REFERENCE TO RELATED APPLICATIONS

This application claims priority to French patent application No. FR 1600153 filed on Jan. 29, 2016, the disclosure of which is incorporated in its entirety by reference herein.

BACKGROUND OF THE INVENTION

(1) Field of the Invention

The present invention relates to a control method for controlling a buoyancy system for an aircraft, to that buoyancy system, and to an aircraft provided with the buoyancy system.

(2) Description of Related Art

Under such circumstances, the invention lies in the technical field of buoyancy systems making it possible for an aircraft to ditch on water and float stably, and more particularly for a rotary wing aircraft to do so.

Such a buoyancy system contributes to enabling an aircraft to float in stable manner after ditching. By way of example, the buoyancy system may be used after being forced to ditch in order to enable the occupants of the aircraft to be evacuated. All aircraft intended for transporting people over an area at sea are in principle fitted with such a buoyancy system.

Certification regulations also specify that an aircraft must be capable of ditching and be stable on water with its buoyancy system. Stability must be guaranteed for states of the free surface of the water and for wind levels that are specified in such certification regulations.

The states of the free surface of the water are also referred to as "sea states" and they apply to any liquid surface. The term "ditching on water" or "ditching" for short thus also covers an aircraft coming down on any free water surface, whether at sea, or on a lake, for example.

A buoyancy system may comprise a plurality of inflatable floats. These inflatable floats may comprise airbags that are inflated by inflation means, which may be explosive or electrical, for example.

Under such circumstances, the buoyancy system includes manual control means connected to the inflation means in order to cause the floats to be inflated, if necessary.

Such manual control means may comprise a manual member that is operated manually by a pilot. For example, a button may be placed on a stick operated by a pilot, the button being connected to an inflator. Operating the button then causes the floats to be inflated.

Such manual control means present the advantage of being capable of being activated by a pilot while in flight, i.e. prior to ditching.

Nevertheless, such manual control means present the drawback of involving action on the part of a pilot who is under highly stressing circumstances and may potentially be under a very great work load.

Furthermore, the floats might be damaged during ditching, depending on the impact to which they are subjected.

Finally, when the floats are inflated in flight, the floats are likely to degrade the stability of the aircraft in flight.

In addition, a buoyancy system may include automatic control means connected to the inflation means for causing the floats to be inflated, if necessary.

Such automatic control means may include immersion sensors connected to an inflator. Each immersion sensor seeks to detect whether the aircraft is immersed, at least in part, and thus whether the aircraft has ditched. For example, when at least two immersion sensors detect the presence of water, the floats are potentially inflated.

The automatic control means present the advantage of not involving the pilot. The floats are inflated as a result of the immersion sensors detecting immersion, should that happen.

Furthermore, the floats are then in a deflated condition while in flight. Under such circumstances, the floats do not risk being damaged during ditching. Furthermore, the floats have no influence on the stability of the aircraft while in flight prior to ditching.

Nevertheless, the floats then become inflated only once the aircraft is afloat. While the floats are deploying on being inflated, they run the risk of degrading the stability of the aircraft on water.

In addition, the time required for inflation needs to be minimized in order to ensure the aircraft does not sink before the floats are inflated.

Documents FR 2 959 725, FR 2 997 923, WO 2006/046038, US 2013/327890, US 2014/124620, and US 2011/226898 are known.

Document FR 2 959 725 describes a method of controlling a buoyancy system for an aircraft, which system includes manual trigger means and automatic trigger means. The method proposes taking account of at least one attitude parameter of the aircraft in order to control the automatic trigger means. In that method, roll and pitching angles are taken into account for activating the automatic trigger means.

BRIEF SUMMARY OF THE INVENTION

An object of the present invention is thus to propose a method seeking to limit some of the above-mentioned drawbacks.

The invention thus provides a control method for controlling a buoyancy system for an aircraft, said aircraft presenting at each instant a ground speed vector presenting, in a reference frame, a current speed component in elevation along an elevation axis directed in the gravity direction and a current horizontal speed component along a horizontal plane perpendicular to said gravity direction, the buoyancy system including at least one float and inflation means for inflating each float.

The method includes a mode of automatic inflation in flight for automatically inflating each float in flight, and presenting the following steps:

during a step of predicting a forthcoming impact with a liquid surface, calculation means determine whether a predetermined ditching condition is true;

during a step of characterizing the forthcoming impact, at least one predicted component of a ditching speed is determined, each predicted component representing an estimated speed of the aircraft during said impact along the gravity direction or in an impact plane perpendicular to the gravity direction; and during an automatic inflation step, each float is automatically inflated in flight by said inflation means when at least the following two conditions are satisfied simultaneously:

said ditching condition is true; and each determined predicted component is less than a corresponding speed threshold.

The method thus enables the floats to be inflated in flight under predetermined conditions.

Specifically, the calculation means perform the above-specified steps repetitively at a processing frequency.

At each calculation instant, the calculation means evaluate a ditching condition. When the ditching condition is true, the calculation means deduce that the aircraft is going to ditch in the short term by impacting a liquid surface.

The term "ditching condition is true" means that the predetermined conditions representative of ditching about to take place in the short term are present at the calculation instant under consideration.

Furthermore, the calculation means evaluate the impact speed that the aircraft is expected to have on impact, if any. As a result, the calculation means evaluate at least one predicted component of a predicted ground speed vector of the aircraft.

Under such circumstances, if the ditching condition is true and if each predicted component is less than a speed threshold, the calculation means deduce that ditching is going to take place at a speed that does not run the risk of damaging inflated floats.

Consequently, the inflation means are activated for inflating the floats.

The method thus makes it possible to authorize inflation of the floats in flight under predetermined conditions. If the predetermined conditions are not satisfied, then inflation of the floats in flight is not initiated. Under such circumstances, the method does not run the risk of leading to the floats being destroyed as a result of the aircraft impacting the liquid surface at high speed.

The method may also include one or more of the following characteristics.

As a result, said method may apply at least one additional inflation mode together with applying the mode for automatic inflation in flight, at least one additional inflation mode being selected from a list comprising a manual inflation mode during which inflation of a float is controlled manually by a person, and a mode of automatic inflation after impact during which the inflation of a float is controlled by at least one immersion sensor.

Consequently, if the floats are not inflated automatically in flight because the required conditions are not satisfied, the floats can be inflated either manually at any time via a manual control member, or else automatically after ditching via at least one immersion sensor.

Furthermore, prior to inflating a float, the calculation means may determine whether inflation of a float is authorized by monitoring manually operable inflation authorization means, it not being possible to inflate any float unless the inflation authorization means have been operated.

The aircraft may include inflation authorization means enabling the buoyancy system to be enabled or disabled. All inflation modes are thus inactive when the buoyancy system is disabled. Conversely, all inflation modes are active when the buoyancy system is enabled at least by operating the inflation authorization means. The inflation authorization means thus make it possible to avoid untimely inflation.

This characteristic makes it possible to inhibit the buoyancy system, e.g. when overflying a solid surface or during a cruising stage of flight taking place at high speed.

Furthermore, the aircraft may include a navigation unit storing a desired track, the track including a takeoff segment, at least one cruising segment, and a landing segment, the calculation means may determine whether inflation of a float is authorized by monitoring the position of the aircraft relative to the track. The mode for automatic inflation in flight is inhibited if the aircraft is in the takeoff segment or the landing segment.

Automatic inflation in flight may be inhibited during a takeoff or landing stage in order to avoid disturbing the flight of the aircraft during these particular flying conditions.

Consequently, the calculation means may communicate with a locating system in order to determine the position of the aircraft relative to the desired track, and, where appropriate, inhibit the mode for automatic inflation in flight.

Likewise, the aircraft may have a lift rotor driven in rotation by at least one engine other than during a stage of autorotation, and the calculation means may monitor the operation of the lift rotor in order to determine whether the aircraft is in a stage of autorotation, the mode of automatic inflation in flight being inhibited during the stage of autorotation.

For example, the calculation means compare the speed of rotation of the lift rotor with the speed of rotation of an expansion turbine of each engine. If the speed of rotation of the lift rotor is faster than the speed of rotation of an expansion turbine, then the calculation means deduce that the aircraft is performing a stage of flight in autorotation and it inhibits the mode of automatic inflation in flight on safety grounds.

Furthermore, during the step of predicting a forthcoming impact with a liquid surface, the calculation means determine whether the aircraft is moving towards a liquid surface, the float being inflated automatically in flight during the step of automatic inflation by the inflation means when the following three conditions are satisfied simultaneously:

said ditching condition is true;

the aircraft is moving towards a liquid surface; and each determined predicted component is less than the corresponding speed threshold.

This variant proposes monitoring not two conditions but three conditions.

For example, a positioning system having an inertial unit and/or satellite locating means, or indeed a radio altimeter serves to determine the travel direction of the aircraft in elevation.

During the step of predicting a forthcoming impact with a liquid surface, the calculation means possibly consider that the aircraft is moving towards a liquid surface if said current speed component in elevation is directed towards the liquid surface.

Furthermore, at each calculation instant, said ditching condition is satisfied when the following inequality is true:

$$\frac{1}{2}MVz0^2 + Mgh0 > h0Fzmax$$

where "M" represents the current mass of the aircraft at said calculation instant, "$Vz0^2$" represents the square of said current speed component in elevation at said calculation instant, "g" represents the acceleration due to gravity, "h0" represents the height of the aircraft at said calculation instant, "Fzmax" represents a constant relating to a maximum lift of the aircraft, ">" represents the greater-than sign of an inequality, and "+" represents the addition sign.

A positioning system having an inertial unit and/or satellite locating means and a radio altimeter serves to determine the current speed in elevation and the height of the aircraft at each calculation instant.

The constant relating to the maximum lift of the aircraft is also determined by testing and/or simulation and/or computation by the manufacturer.

Consequently, if the inequality is true at a calculation instant, then the calculation means deduce that the aircraft is going to ditch in the short term.

This relationship is not obvious, since the equation is the result of assumptions made by the Applicant.

Specifically, the total energy prior to impact of the aircraft has the following form:

$$\frac{1}{2}M(Vx0^2 + Vz0^2) + Mgh0$$

where "M" represents the current mass of the aircraft at said calculation instant, "$Vz0^2$" represents the square of said current speed component in elevation at said calculation instant, "$Vx0^2$" represents the square of the current horizontal speed component of the aircraft at said calculation instant, "g" represents the acceleration due to gravity, "h0" represents the height of the aircraft at said calculation instant, and "+" represents the addition sign.

Assuming that the lift of the aircraft is constant and applying simplifying assumptions including assuming that the rotorcraft is descending, an impact will occur if the following intermediate relationship is true:

$$\frac{1}{2}M(Vx0^2 + Vz0^2) + Mgh0 > \frac{1}{2}M(Vximpact^2) + h0Fzmax$$

where "M" represents the current mass of the aircraft at said calculation instant, "$Vz0^2$" represents the square of said current speed component in elevation at said calculation instant, "$Vx0^2$" represents the square of the current horizontal speed component of the aircraft at said calculation instant, "g" represents the acceleration due to gravity, "$Vximpact^2$" represents the square of the horizontal component of the ground speed of the aircraft during the impact, "Fzmax" represents a constant relating to a maximum lift of the aircraft, "h0" represents the height of the aircraft at said calculation instant, and "+" represents the addition sign.

Assuming that the current horizontal speed component of the aircraft does not vary while the aircraft is descending, the above intermediate relationship is equal to the above-described inequality.

In addition, the aircraft may have at least one engine and a fuel system that feeds each engine with fuel at a fuel flow rate, the current mass may be determined at each calculation instant by performing the following steps:

determining the initial mass of the aircraft prior to starting the engines;

determining a consumed mass of fuel that has been consumed since said starting; and determining the current mass of the aircraft at said calculation instant by subtracting the consumed mass from the initial mass.

The initial mass may be measured by weighing on the ground or it may be estimated on the basis of a predetermined empty mass of the aircraft and an estimate of the mass loaded on the aircraft.

The consumed mass may also be determined from the flow rate of the fuel fed to the engines and from the density of the fuel.

Furthermore, each predicted component that is to be determined may possibly be selected from a list comprising a horizontal predicted component and a predicted component in elevation respectively in the impact plane and in the gravity direction.

The calculation means may compare either a predicted horizontal component with a first speed threshold, or a predicted component in elevation with a second speed threshold, or the predicted horizontal component with the first speed threshold and the predicted component in elevation with the second speed threshold.

Optionally, and in a first variant, at each calculation instant, at least one predicted component of the ditching speed in a direction referred to as a "particular" direction for convenience is determined by performing the following steps:

determining the estimated time remaining prior to said impact with the liquid surface by solving the following equation:

$$\text{Gamma}\frac{\Delta T^2}{2} + V0\Delta T + h0 = 0$$

where "gamma" represents a component of the current acceleration of the aircraft in said particular direction, "$\Delta T$" represents said estimated time, "$\Delta T^2$" represents the square of said estimated time, "V0" represents said component of the current speed of the aircraft in said particular direction at said calculation instant, and "h0" represents the height of the aircraft at said calculation instant; and determining the predicted component of the predicted ditching speed in said particular direction as a function of time estimated using the following equation:

$$V\text{impact} = \text{gamma}\Delta T + V0$$

where "Vimpact" represents said predicted component of the ditching speed in said particular direction.

The term "particular direction" may represent the gravity direction or the horizontal impact plane. Under such circumstances, the predicted horizontal component and/or the predicted component in elevation may be determined in this way.

Specifically, the predicted horizontal component may be determined using the following two equations:

$$\text{Gammax}\frac{\Delta T^2}{2} + V0x\Delta T + h0 = 0$$

$$V\text{impactx} = \text{gammax}\Delta T + V0$$

where "gammax" represents a component of the current horizontal acceleration of the aircraft in the impact plane, "$\Delta T$" represents said estimated time, "$\Delta T^2$" represents the square of said estimated time, "$V0x$" represents a component of the current horizontal speed of the aircraft in the impact plane, "h0" represents the height of the aircraft at said calculation instant, and "Vimpactx" represents said predicted horizontal component of the ditching speed in the impact plane.

Likewise, the predicted component in elevation may be determined using the following two equations:

$$Gammaz \frac{\Delta T^2}{2} + V0z\Delta T + h0 = 0$$

$$Vimpactz = gammaz\Delta T + V0$$

where "gammaz" represents a component of the current acceleration in elevation of the aircraft along the axis in elevation of the aircraft, "ΔT" represents said estimated time, "ΔT²" represents the square of said estimated time, "V0z" represents a component of the current speed in elevation of the aircraft along said axis in elevation, "h0" represents the height of the aircraft at said calculation instant, and "Vimpactz" represents said predicted component in elevation of the ditching speed along said axis in elevation.

In a second variant, at each calculated instant, at least one predicted component of the ditching speed in a particular direction may be made equal to the current speed component in that particular direction.

Consequently, the predicted component in elevation of the ditching speed along the axis in elevation may be made equal to the component of the current speed in elevation along said axis in elevation. Likewise, the predicted horizontal component of the ditching speed in the horizontal impact plane may be made equal to the current horizontal speed component in the horizontal plane.

The first variant and the second variant may both be implemented on the same aircraft. For example, the calculation means may use the first variant by default, with the second variant being used only if the first variant does not give any result.

In addition, the speed threshold corresponding to the predicted horizontal component may be equal to 30 knots (kt), with the speed threshold corresponding to the predicted component in elevation possibly being equal to 1.5 meters per second.

It should be recalled that one knot corresponds to 0.514 meters per second, so 30 knots is equal to 15.42 meters per second.

The Applicant has observed that inflated floats can withstand an impact taking place at an impact speed complying with the speed threshold.

In addition to a method, the invention provides a buoyancy system comprising at least one float and inflation means for inflating each float, the buoyancy system having a control system for issuing an order to inflate each float to the inflation means.

The control system is provided with calculation means that apply the above-described method.

The invention also provides an aircraft including the buoyancy system. By way of example, the aircraft may be a rotorcraft.

In addition to calculation means, the control system may include various other pieces of equipment. The control system may thus comprise at least the following pieces of equipment:

a positioning system having an inertial unit and/or satellite locating means, and/or indeed a radio altimeter;

a rotary speed measurement system comprising a sensor for sensing the rotary speed of a rotor and/or at least one sensor for measuring a speed of rotation of an expansion turbine of an engine;

at least one immersion sensor;

a manually-operable control member for causing each float to be inflated;

manually-operable inflation authorization means for enabling/disabling the buoyancy system;

a determination system for estimating the mass of the aircraft, this system being provided for example with a flow meter and a memory storing an empty mass and a density of the fuel that is in use; and a navigation unit.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 4 is a diagram explaining the method of the invention.

DETAILED DESCRIPTION OF THE INVENTION

Figure 1:
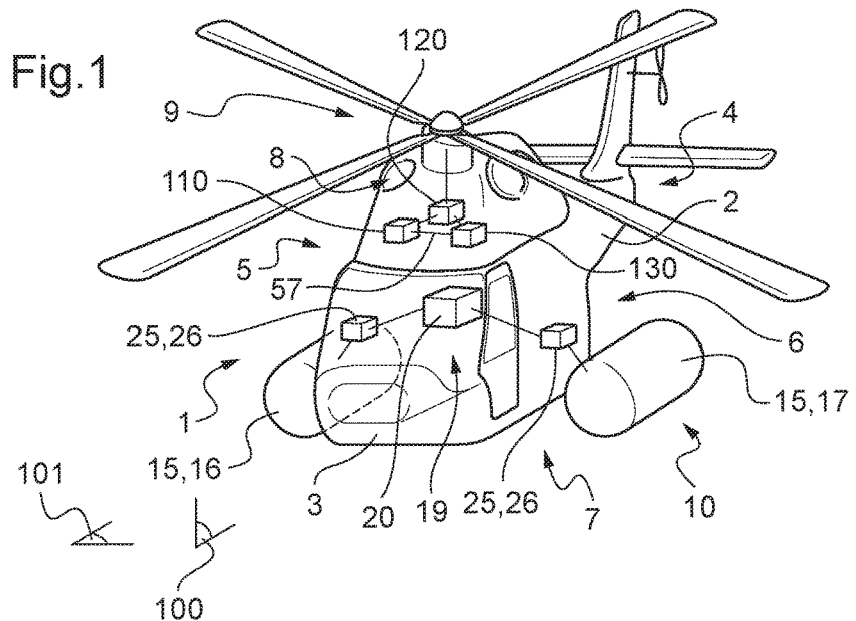
FIG. 1 is a diagram showing an aircraft provided with a buoyancy system of the invention.

FIG. 1 shows an aircraft 1 provided with a buoyancy system 10 of the invention.

The aircraft 1 comprises a fuselage 2 extending longitudinally from a front end 3 to a rear end 4. In addition, the fuselage 2 extends transversely from a left flank 5 to a right flank 6 ("left" and "right" as shown in the drawings) on either side of an anteroposterior plane of symmetry 100, and in elevation from a low portion 7 to a high portion 8.

The low portion is conventionally provided with landing gear, while the high portion may carry a rotor 9 for providing lift and possibly propulsion. The low portion may include a lower section defined in particular by the floor of a cabin and the outside shell of the fuselage.

The lift rotor 9 is driven in rotation by at least one engine 110 via a power transmission main gearbox 120. The engine 110 may be a turboshaft engine having an expansion turbine secured to a drive shaft connected mechanically to the power transmission main gearbox 120.

The engine is fed with fuel from at least one tank of a fuel system 130. A flow meter 57 optionally serves to measure the flow rate of fuel supplied to the engines.

The aircraft 1 is also provided with a buoyancy system 10 of the invention in order to enable to ditch on water.

Such a buoyancy system is provided with at least one float 15. By way of example, the buoyancy system is provided with at least two floats 15 arranged on either side of the fuselage 2 of the aircraft. Thus, a float 15 referred to as the "left" float 16 is arranged beside the left flank of the aircraft, while a float 15 referred to as the "right" float 17 is arranged beside the right flank of the aircraft.

The floats 15 may be paired. Under such circumstances, the floats 15 of a pair may be arranged symmetrically on either side of the anteroposterior plane 100 of symmetry of the aircraft in a stable position of the aircraft.

FIG. 1 shows an aircraft that has a single pair of floats 15. Nevertheless, the aircraft could have more than two floats. For example, the aircraft could have four floats.

Each float may be arranged close to the lower section of the aircraft so as to keep the aircraft afloat, or indeed between the low portion 7 and the high portion 8.

The floats may be floats that are inflatable by inflation means 25 of the buoyancy system 10. Under such circumstances, the floats are deflated except during ditching. The floats may in particular be folded inside a cover provided for this purpose.

The inflation means 25 include at least one inflator 26 for inflating the floats. Each inflator may be constituted by an inflator that is electrical, explosive, or chemical, . . . .

By way of non-exclusive example, an inflator 26 may be connected to a plurality of floats 15. In contrast, FIG. 1 shows inflation means 25 comprising a plurality of inflators 26.

Reference may be made to the state of the art in order to find embodiments of floats and inflation means for such floats.

Furthermore, the buoyancy system is provided with at least one control system 19 for controlling at least one inflator. The control system 19 is then connected to at least one inflator 26 in order to cause the floats 15 to be inflated.

Figure 2:
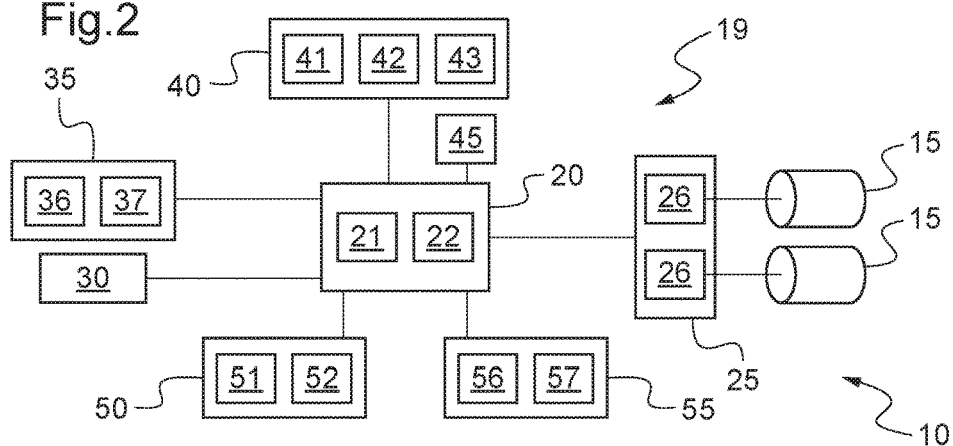
FIG. 2 is a diagram showing a buoyancy system of the invention.

FIG. 2 shows a control system 19 of the invention.

The control system 19 includes calculation means 20. The calculation means 20 are connected to the inflation means 25, e.g. to each inflator 26.

By way of example, the calculation means 20 may comprise at least one processor, at least one integrated circuit, at least one programmable system, at least one logic circuit, these examples not limiting the scope given to the term "calculation means".

In the example shown, the calculation means 20 comprise at least one processor 21 executing instructions stored in a memory 22 for controlling the inflators.

Furthermore, various members may be connected to the calculation means 20 depending on the variant that is implemented.

Thus, the calculation means 20 may communicate with a positioning system 40 for determining the position and the movement of the aircraft in three-dimensional space. This movement may be obtained by determining the speeds of the aircraft, the accelerations of the aircraft, the height of the aircraft, . . . .

The term "height" should be understood broadly. Specifically, the term "height" may refer to the height as such of the aircraft or the altitude of the aircraft, with the meaning of the term depending on the measurement instruments used.

The positioning system 40 may comprise an inertial measurement unit 41 and/or satellite locating means 42, and/or a radio altimeter 43, for example.

Usually, an inertial measurement unit 41 has at least three accelerometers and at least three gyros.

By way of example, the satellite locating means 42 may comprise a receiver of a system known under the acronym GPS, or an equivalent system.

In addition, the calculation means 20 may be connected to a navigation unit 45 in order to determine the position of the aircraft relative to a desired track. Conventionally, such a track includes a takeoff segment, at least one cruising segment, and a landing segment.

A navigation unit may comprise a processor or the equivalent together with a memory storing maps for enabling a user to program the desired track.

Furthermore, the calculation means 20 may be connected to a system 50 that makes it possible to determine whether the aircraft is flying in autorotation. The system 50 may be a system for measuring speed of rotation, having a first measurement sensor 51 measuring the speed of rotation of the lift rotor 9 and/or at least one second measurement sensor 52 measuring the speed of rotation of an expansion turbine of an engine.

Furthermore, the calculation means 20 may be connected to means 36 suitable for implementing "additional" inflation modes. Thus, the calculation means 20 may be connected to at least one immersion sensor 36 and/or to a manually-operable control member 37 for causing each float to be inflated. Such a control member 37 may be in the form of a pushbutton, a rotary knob, a rocker switch, . . . and an immersion sensor may be in the form of a sensor for detecting the presence of water.

In addition, the calculation means 20 may be connected to inflation authorization means 30 that are manually-operable to enable/disable the buoyancy system. The inflation authorization means 30 may be in the form of a pushbutton, a rotary knob, a rocker switch, and similar features.

Finally, the calculation means 20 may be connected to a determination system 35 for estimating the mass of the aircraft. By way of example, the determination system 35 includes a flow meter 57 and a memory 56 storing an empty mass and a density of the fuel being used.

Two different elements of the control system may together constitute a single piece of equipment.

Figure 3:
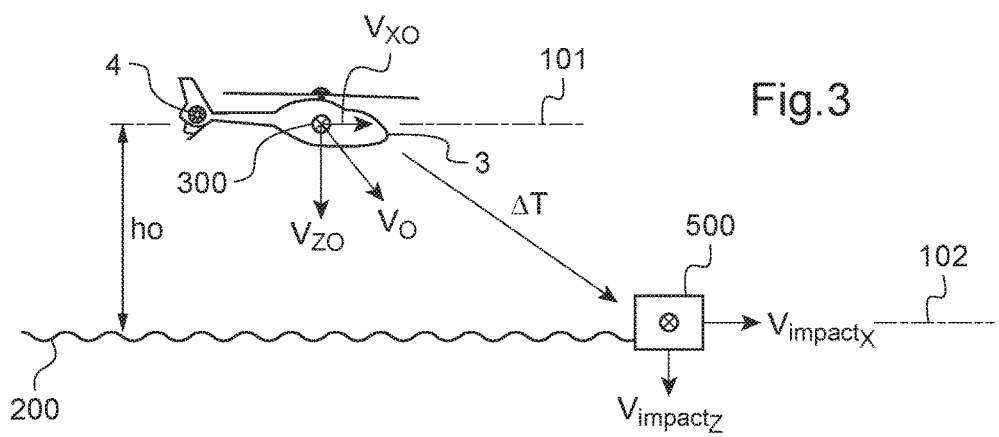
FIG. 3 is a diagram showing an aircraft of the invention in flight prior to ditching on water.

With reference to FIG. 3, the aircraft 1 is situated at each instant it is in flight at an altitude h0, in particular over a liquid surface 200. The lift of the aircraft 1, e.g. as provided by a lift rotor 9, may include a component Fz directed in the gravity direction.

A manufacturer may determine the maximum lift Fzmax of the aircraft.

The aircraft is traveling at a ground speed $\vec{V_0}$. The vector representing the ground speed may be resolved at least into a current horizontal speed component Vx0 and a current speed component in elevation Vz0 directed in the gravity direction. The current horizontal speed component Vx0 represents the component of the vector representing the ground speed in a horizontal plane 101 perpendicular to the gravity direction.

It can happen that the aircraft is in danger of impacting against the liquid surface 200 at the end of a duration ΔT. This impact 500 is represented by a cross in FIG. 3 and it occurs at an impact speed with a non-zero horizontal component Vimpactx in an impact plane 102. The impact plane 102 is horizontal and thus orthogonal to the gravity direction at the point of impact.

Under such circumstances, the control system applies the method of the invention in order to inflate the floats 15 so as to keep the aircraft 1 afloat after ditching.

With reference to FIG. 4, the method may include a mode MOD1 for automatic inflation in flight, a mode MOD2 for manual inflation during which the inflation of a float 15 is controlled manually by a person, and/or a mode MOD3 for automatic inflation after impact.

Prior to performing one of these modes of operation, the method may include a preliminary enabling step STP01.

This preliminary enabling step STP01 seeks to determine whether inflation of the floats 15 is or is not authorized. If not, the buoyancy system is disabled. Under such circumstances, when the buoyancy system is enabled, the inflation means 25 is capable of deploying each float 15, whereas, on the contrary, inflation of the float is prevented when the buoyancy system is not enabled. For example, the inflators are inhibited by not being powered electrically.

Consequently, the calculation means can monitor the inflation authorization means 30 during a first enabling step STP01 in order to determine whether a person is seeking to enable inflation.

Thereafter, if a person operates the inflation authorization means 30, the inflation authorization means 30 send an enabling signal to the calculation means 20. The term "monitoring the inflation authorization means 30" means that the calculation means 20 monitor orders issued by the inflation authorization means 30 to the calculation means.

If inflation of the floats is authorized, the manual inflation mode MOD2 is implemented during a manual step STP4 when a person operates a control member 37. The control member 37 then sends a signal to the calculation means 20, with the calculation means then causing the floats 15 to be inflated.

If inflation of the floats is authorized, the automatic inflation-after-impact mode MODS is implemented during a step STP5 after immersion, when at least one immersion sensor detects immersion. Each immersion sensor 36 in question then sends a signal to the calculation means 20, the calculation means causing the floats 15 to be inflated.

If inflation of the floats is authorized, the automatic in-flight inflation mode MOD1 may serve to cause each float 15 to be inflated automatically in flight under predetermined conditions.

During an optional second enabling step STP02, the calculation means 20 may interrogate the navigation unit 45 and the positioning system 40 to determine at each calculation instant whether the aircraft is following a takeoff segment or a landing segment of the desired track. If so, the automatic in-flight inflation mode MOD1 is inhibited.

In additional or alternative manner, the calculation means inhibit the automatic in-flight inflation mode MOD1 during a stage of autorotation.

Thus, the calculation means 20 monitor the lift rotor 9 in order to determine whether the aircraft 1 is in a stage of autorotation.

Consequently, the calculation means 20 determine whether the speed of rotation of the lift rotor is greater than the speed of rotation of the drive shaft of each engine by interrogating the speed measurement system 50. If so, the automatic in-flight inflation mode MOD1 is inhibited.

If the automatic in-flight inflation mode MOD1 is not inhibited, then during a first step STP11 of a step of predicting a forthcoming impact against a liquid surface STP1, the calculation means 20 determine whether a predetermined ditching condition is satisfied.

By way of example, the calculation means determine at each calculation instant whether the following inequality is satisfied:

$$\frac{1}{2}MVz0^2 + Mgh0 > h0Fzmax$$

where "M" represents the current mass of the aircraft at said calculation instant, "$Vz0^2$" represents the square of said current speed component in elevation of the aircraft at said calculation instant, "g" represents the acceleration due to gravity, "h0" represents the height of the aircraft at said calculation instant, "Fzmax" represents a constant relating to a maximum lift of the aircraft, ">" represents the greater-than sign of an inequality, and "+" represents the addition sign.

To this end, the calculation means can interrogate the positioning system 40 in order to determine the values of the current speed component in elevation and of the height h0, with the constant Fzmax being stored in the calculation means, for example.

The mass M may be a stored mean mass, or it may be evaluated at each calculation instant.

By way of example, an initial mass Mini and a density of the fuel are stored in the calculation means or in an auxiliary memory.

Under such circumstances, at each calculation instant, the calculation means determine the consumed mass Mcons of the fuel that has been consumed by the engines. This consumed mass Mcons may be calculated continuously on the basis of the density of the fuel and of the fuel flow rate delivered to the engine and measured by the flow meter 57.

Thereafter, the calculation means deduce the current mass M of the aircraft therefrom by subtracting the consumed mass Mcons from the initial mass Mini using the following subtraction:

$$M = \text{Mini} - \text{Mcons}$$

Optionally, during a second step STP12 of the step of predicting a forthcoming impact SPT1, the calculation means 20 determine whether the aircraft 1 is moving towards a liquid surface 200.

For this purpose, the calculation means can interrogate the positioning system in order to determine whether the current speed component in elevation of the aircraft is directed towards the liquid surface 200.

At a given calculation instant, the operation of the in-flight inflation mode MOD1 continues if the ditching condition is true, and optionally if the aircraft is moving towards a liquid surface.

Furthermore, during a first stage STP21 of a step STP2 of characterizing the forthcoming impact, at least one predicted component Vimpactx and/or Vimpactz of a ditching speed is determined. Each predicted component Vimpactx, Vimpactz represents an estimated speed of the aircraft 1 in a particular direction of the aircraft represented by gravity and by the horizontal impact plane.

Each predicted component can thus be a horizontal predicted component Vimpactx present in an impact plane parallel to the current horizontal plane 101 and a predicted component in elevation Vimpactz in the gravity direction.

In order to determine the predicted component, the calculation means can determine a duration representing the estimated time remaining prior to the impact with the liquid surface by solving the following equation:

$$\text{Gamma}\frac{\Delta T^2}{2} + V0\Delta T + h0 = 0$$

where "gamma" represents a component of the current acceleration of the aircraft in said particular direction, "$\Delta T$" represents said estimated time, "$\Delta T^2$" represents the square of said estimated time, "V0" represents said component of the current speed of the aircraft in said particular direction at said calculation instant, and "h0" represents the height of the aircraft at said calculation instant.

Under such circumstances, the calculation means 20 can determine the predicted component of the predicted ditching speed as a function of time, which predicted component is estimated using the following equation:

$$V\text{impact} = \text{gamma}\Delta T + V0$$

where "Vimpact" represents said predicted component of the ditching speed in said particular direction.

Alternatively, or in addition, at least one predicted component of the estimated impact speed is equal to the corresponding current speed component.

Under such circumstances, during a second stage STP22 of a step STP2 of characterizing the forthcoming impact, each predicted component is compared with a speed threshold. For example, the horizontal predicted component Vimpactx is compared with a horizontal speed threshold equal to 30 knots, the predicted component in elevation Vimpactz being compared with a speed threshold in elevation equal to 1.5 meters per second.

If each predicted component is less than the corresponding speed threshold, an automatic inflation step STP3 can be implemented. During this automatic inflation step STP3, the calculation means 20 cause the inflation means 35 to inflate the floats.

Thereafter, during the automatic inflation step STP3, each float 15 is automatically inflated in flight by the inflation means 25 when at least the following two conditions are satisfied simultaneously: said ditching condition is true, and each of said determined predicted components is less than the corresponding speed threshold. Optionally, inflation is also dependent on a third condition that consists in verifying whether the aircraft is moving towards a liquid surface.

Thereafter, when the buoyancy system is enabled and if the manual inflation mode MOD2 is not inhibited, the calculation means 20 apply the steps of the manual inflation mode MOD2 in order to determine whether the floats need to be inflated.

In parallel, the calculation means 20 apply the manual inflation mode MOD2, while monitoring possible operation of the control member 37 during a monitoring step STP5.

If the floats are not inflated in flight and if ditching has occurred, the calculation means 20 apply the manual inflation mode MOD2 by monitoring potential operation of the control member 37.

In parallel, the calculation means may inflate the floats after ditching in application of the mode MODS of automatic inflation after impact, as soon as immersion is detected by at least one immersion sensor during a monitoring step STP4.

Naturally, the present invention may be subjected to numerous variants as to its implementation. Although several implementations are described, it will readily be understood that it is not conceivable to identify exhaustively all possible implementations. It is naturally possible to envisage replacing any of the means described by equivalent means without going beyond the ambit of the present invention.

For example, FIG. 4 shows a step STP2 of characterizing an impact that is performed after a step STP1 of predicting a forthcoming impact with a liquid surface. Nevertheless, these steps may be performed in a different order or indeed at the same time.

What is claimed is:

1. A control method for controlling a buoyancy system for an aircraft, the aircraft presenting at each instant a ground speed vector presenting in a reference frame a current speed component in elevation along an elevation axis directed in the gravity direction and a current horizontal speed component along a horizontal plane perpendicular to the gravity direction, the buoyancy system including at least one float and inflation means for inflating each float, the method including a mode (MOD1) of automatic inflation in flight for automatically inflating each float in flight, and presenting the following steps:

during a step (STP1) of predicting a forthcoming impact with a liquid surface, calculation means determine whether a predetermined ditching condition is true; wherein:

during a step (STP2) of characterizing the impact, at least one predicted component (Vimpactx, Vimpactz) of a ditching speed is determined, each predicted component (Vimpactx, Vimpactz) representing an estimated speed of the aircraft during the impact along the gravity direction or in an impact plane perpendicular to the gravity direction; and during an automatic inflation step (STP3), each float is automatically inflated in flight by the inflation means when at least the following two conditions are satisfied simultaneously:
the ditching condition is true; and
each determined predicted component (Vimpactx, Vimpactz) is less than a corresponding speed threshold.

2. A method according to claim 1, wherein the method applies at least one additional inflation mode together with applying the automatic inflation mode (MOD1), at least one additional inflation mode being selected from a list comprising a manual inflation mode (MOD2) during which inflation of a float is controlled manually by a person, and a mode (MOD3) of automatic inflation after impact during which the inflation of a float is controlled by at least one immersion sensor.

3. A method according to claim 1, wherein prior to inflating a float, the calculation means determine whether inflation of a float is authorized by monitoring manually operable inflation authorization means, it not being possible to inflate any float unless the inflation authorization means have been operated.

4. A method according to claim 1, wherein the aircraft includes a navigation unit storing a desired track, the track including a takeoff segment, at least one cruising segment, and a landing segment, the calculation means determine whether inflation of a float is authorized by monitoring the position of the aircraft relative to the track, the mode (MOD1) for automatic inflation in flight is inhibited if the aircraft is in the takeoff segment or the landing segment.

5. A method according to claim 1, wherein the aircraft has a lift rotor driven in rotation by at least one engine other than during a stage of autorotation, and the calculation means monitor the operation of the lift rotor in order to determine whether the aircraft is in a stage of autorotation, the mode (MOD1) of automatic inflation in flight being inhibited during the stage of autorotation.

6. A method according to claim 1, wherein during the step (STP1) of predicting a forthcoming impact with a liquid surface, the calculation means determine whether the aircraft is moving towards a liquid surface, the float being inflated automatically in flight during the step (STP3) of automatic inflation by the inflation means when the following three conditions are satisfied simultaneously:
the ditching condition is true;
the aircraft is moving towards a liquid surface; and
each determined predicted component is less than the corresponding speed threshold.

7. A method according to claim 1, wherein during the step (STP1) of predicting a forthcoming impact with a liquid surface, the calculation means consider that the aircraft is moving towards a liquid surface if the current speed component in elevation is directed towards the liquid surface.

8. A method according to claim 1, wherein, at each calculation instant, the ditching condition is satisfied when the following inequality is true:

$$\frac{1}{2}MVz0^2 + Mgh0 > h0Fzmax$$

where "M" represents the current mass of the aircraft at the calculation instant, "Vz0²" represents the square of the current speed component in elevation at the calculation instant, "g" represents the acceleration due to gravity, "h0" represents the height of the aircraft at the calculation instant, "Fzmax" represents a constant relating to a maximum lift of the aircraft, ">" represents the greater-than sign of an inequality, and "+" represents the addition sign.

9. A method according to claim 8, wherein the aircraft (1) has at least one engine and a fuel system that feeds each engine with fuel at a fuel flow rate, the current mass (M) is determined at each calculation instant by performing the following steps:
   determining the initial mass (Mini) of the aircraft (1) prior to starting the engines;
   determining a consumed mass (Mcons) of fuel that has been consumed since the starting; and
   determining the current mass (M) of the aircraft at the calculation instant by subtracting the consumed mass (Mcons) from the initial mass (Mini).

10. A method according to claim 1, wherein each predicted component that is to be determined is selected from a list comprising a horizontal predicted component (Vimpactx) and a predicted component in elevation (Vimpactz) respectively in the impact plane and in the gravity direction.

11. A method according to claim 10, wherein, at each calculation instant, at least one predicted component of the ditching speed in a direction referred to as a "particular" direction for convenience is determined by performing the following steps:
   determining the estimated time remaining prior to the impact with the liquid surface by solving the following equation:

$$\text{Gamma}\frac{\Delta T^2}{2} + V0\Delta T + h0 = 0$$

where "gamma" represents a component of the current acceleration of the aircraft in the particular direction, "ΔT" represents the estimated time, "ΔT²" represents the square of the estimated time, "V0" represents the component of the current speed of the aircraft in the particular direction at the calculation instant, and "h0" represents the height of the aircraft at the calculation instant; and
   determining the predicted component of the predicted ditching speed in the particular direction as a function of time, which is estimated using the following equation:

$$Vimpact = \text{gamma}\Delta T + V0$$

where "Vimpact" represents the predicted component of the ditching speed in the particular direction.

12. A method according to claim 10, wherein, at each calculated instant, at least one predicted component of the ditching speed in a particular direction is made equal to the current speed component in that particular direction.

13. A method according to claim 10, wherein the speed threshold (SX) corresponding to the predicted horizontal component (Vimpactx) is equal to 30 knots.

14. A method according to claim 10, wherein the speed threshold (SZ) corresponding to the predicted component in elevation (Vimpactz) is equal to 1.5 meters per second.

15. A buoyancy system comprising at least one float and inflation means for inflating each float, the buoyancy system having a control system for issuing an order to inflate each float to the inflation means, wherein the control system is provided with calculation means applying the method according to claim 1.

16. An aircraft, wherein the aircraft includes a buoyancy system according to claim 15.

* * * * *